United States Patent
Lee et al.

(10) Patent No.: US 9,342,366 B2
(45) Date of Patent: May 17, 2016

(54) INTRUSION DETECTION APPARATUS AND METHOD USING LOAD BALANCER RESPONSIVE TO TRAFFIC CONDITIONS BETWEEN CENTRAL PROCESSING UNIT AND GRAPHICS PROCESSING UNIT

(71) Applicant: ELECTRONICS AND TELECOMMUNICATIONS RESEARCH INSTITUTE, Daejeon (KR)

(72) Inventors: Junghee Lee, Daejeon (KR); Sungryoul Lee, Daejeon (KR); Deokjin Kim, Daejeon (KR); Young Han Choi, Daejeon (KR); Byungchul Bae, Daejeon (KR); HyungGeun Oh, Daejeon (KR); Kiwook Sohn, Daejeon (KR); KyoungSoo Park, Daejeon (KR); Yung Yi, Daejeon (KR); Jihyung Lee, Iksan-si (KR); Sangwoo Moon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 165 days.

(21) Appl. No.: 14/053,655

(22) Filed: Oct. 15, 2013

(65) Prior Publication Data
US 2014/0109105 A1    Apr. 17, 2014

(30) Foreign Application Priority Data

Oct. 17, 2012  (KR) .......... 10-2012-0115226
Aug. 14, 2013  (KR) .......... 10-2013-0096273

(51) Int. Cl.
*G06F 9/455* (2006.01)
*G06F 9/46* (2006.01)
(Continued)

(52) U.S. Cl.
CPC .......... *G06F 9/505* (2013.01); *G06F 21/554* (2013.01); *G06F 21/85* (2013.01); *H04L 63/1416* (2013.01); *G06F 9/5027* (2013.01)

(58) Field of Classification Search
CPC .......... G06F 9/50–9/505; G06F 21/554; G06F 21/85; G06F 9/5027; H04L 63/1416
See application file for complete search history.

(56) References Cited

U.S. PATENT DOCUMENTS 7,818,806 B1 * 10/2010 Gyugyi et al. .......... 726/24
8,391,174 B2 *  3/2013 Schlansker ........... H04L 43/18
                                                              370/235

(Continued)

FOREIGN PATENT DOCUMENTS

KR   10-2003-0010263 A   2/2003
KR   10-2010-0013815 A   2/2010

(Continued)

OTHER PUBLICATIONS

Muhammad Jamshed, Kargus: a Highly-scalable Software-based Intrusiion Detection System, 2012, pp. 1-12.*

(Continued)

*Primary Examiner* — Thuy Dao
*Assistant Examiner* — Mongbao Nguyen
(74) *Attorney, Agent, or Firm* — LRK Patent Law Firm (57) ABSTRACT

An intrusion detection apparatus and method using a load balancer responsive to traffic conditions between a central processing unit (CPU) and a graphics processing unit (GPU) are provided. The intrusion detection apparatus includes a packet acquisition unit, a character string check task allocation unit, a CPU character string check unit, and a GPU character string check unit. The packet acquisition unit receives packets, and stores the packets in a single task queue. The character string check task allocation unit determines the number of packets in the packet acquisition unit, and allocates character string check tasks to the CPU or the GPU. The CPU character string check unit compares the character strings of the packets with a character string defined in at least one detection rule inside the CPU. The GPU character string check unit compares the character strings of the packets with the character string inside the GPU.

15 Claims, 5 Drawing Sheets

(51) Int. Cl.
*G06F 9/50* (2006.01)
*H04L 29/06* (2006.01)
*G06F 21/55* (2013.01)
*G06F 21/85* (2013.01)

(56) References Cited

U.S. PATENT DOCUMENTS

| | | | |
|---|---|---|---|
| 8,860,736 B2 * | 10/2014 | Song | G06F 7/504 345/501 |
| 9,166,992 B1 * | 10/2015 | Stickle | H04L 63/1408 |
| 2005/0149940 A1 * | 7/2005 | Calinescu et al. | 718/104 |
| 2008/0163239 A1 * | 7/2008 | Sugumar et al. | 718/105 |
| 2008/0184254 A1 * | 7/2008 | Bernard | G06F 9/505 718/105 |
| 2008/0276220 A1 * | 11/2008 | Munshi | G06F 8/314 717/119 |
| 2009/0217369 A1 * | 8/2009 | Abeni | G06F 9/526 726/13 |
| 2009/0262659 A1 * | 10/2009 | Sturges et al. | 370/253 |
| 2009/0265707 A1 * | 10/2009 | Goodman | G06F 9/5016 718/1 |
| 2009/0307704 A1 * | 12/2009 | Munshi | G06F 9/4843 718/104 |
| 2010/0117569 A1 * | 5/2010 | Trainer | H02P 9/00 318/400.3 |
| 2010/0157800 A1 * | 6/2010 | Liu | H04L 47/10 370/235 |
| 2010/0281480 A1 * | 11/2010 | Keller | G06F 9/5027 718/100 |
| 2011/0010721 A1 * | 1/2011 | Gupta | G06F 9/5077 718/103 |
| 2011/0035751 A1 * | 2/2011 | Krishnakumar | G06F 9/4881 718/103 |
| 2011/0142064 A1 * | 6/2011 | Dubal et al. | 370/412 |
| 2011/0149727 A1 | 6/2011 | Yoon et al. | |
| 2011/0321057 A1 * | 12/2011 | Mejdrich | G06F 9/505 718/105 |
| 2012/0079501 A1 * | 3/2012 | Sandstrom | G06F 9/5066 718/105 |
| 2012/0192200 A1 * | 7/2012 | Rao | G06F 9/4893 718/105 |
| 2012/0266175 A1 * | 10/2012 | Zheng | 718/103 |
| 2012/0278811 A1 * | 11/2012 | Baynast | G06F 9/5027 718/104 |
| 2013/0050229 A1 * | 2/2013 | Song et al. | 345/502 |
| 2013/0081044 A1 * | 3/2013 | Sandstrom | G06F 15/80 718/104 |
| 2013/0219397 A1 * | 8/2013 | Adams | G06F 9/5022 718/102 |

FOREIGN PATENT DOCUMENTS

| | | |
|---|---|---|
| KR | 10-2011-0071817 A | 6/2011 |
| KR | 10-2011-0098269 A | 9/2011 |
| KR | 10-2012-0019711 A | 3/2012 |
| KR | 10-2013-0081140 A | 7/2013 |

OTHER PUBLICATIONS

Monther Aldwairi, Configurable String Matching Hardware for Speeding up Intrusion Detection, 2005, pp. 1-7.*
Nathan Tuck, Deterministic Memory-Efficient String Matching Algorithms for Instrusion Detection, 2004, pp. 1-12.*
Giorgos Vasiliadis et al., "MIDeA: A Multi-Parallel Intrusion Detection Architecture," Proceedings of the ACM Conference on Computer Security(CCS), 2011.

* cited by examiner

INTRUSION DETECTION APPARATUS AND METHOD USING LOAD BALANCER RESPONSIVE TO TRAFFIC CONDITIONS BETWEEN CENTRAL PROCESSING UNIT AND GRAPHICS PROCESSING UNIT

CROSS REFERENCE TO RELATED APPLICATIONS

This application claims the benefit of Korean Patent Application Nos. 10-2012-0115226 and 10-2013-0096273, filed on Oct. 17, 2012 and Aug. 14, 2013, respectively, which are hereby incorporated by reference in their entirety into this application.

BACKGROUND OF THE INVENTION

1. Technical Field

The present invention relates generally to an intrusion detection apparatus and method using a load balancer responsive to traffic conditions between a central processing unit (CPU) and a graphics processing unit (GPU) and, more particularly, to an intrusion detection apparatus and method using a load balancer responsive to traffic conditions between a CPU and a GPU, which allocate intrusion detection tasks to a CPU or a GPU while taking into account processing performance and power consumption based on traffic conditions.

2. Description of the Related Art

Conventional general-purpose operating systems (OSs) are configured to be inefficient in high-speed packet input and output, and thus loss of packets occurs, with the result that they are limited in ability to perform intrusion detection with respect to the entire traffic. Meanwhile, packet checks using regular expressions require high computational capability and memory bandwidth, and thus a method using special hardware, such as a field programmable gate array (FPGA), has been sometimes used. However, since this method requires the installation of dedicated hardware, high cost is incurred and there are difficulties dynamically adding or deleting detection rules. As a variety of high-performance hardware have appeared, software-based methods using a 10 Gbps or higher high-speed network interface controller (NIC) card, a multi-core CPU and a many-core GPU has been proposed in order to process high-speed packets. However, these methods are problematic in that the problem of an increase in power consumption attributable to the use of the GPU or the problem of load required to transmit data to the GPU is not taken into account or in that a reduction in the performance of the entire system may occur due to standby for reception because, upon processing a large number of packets at the same time, a specific number of packets are all received and then subsequent tasks are performed.

In connection with this, Korean Patent Application Publication No. 2011-0071817 discloses a technology related to "Traffic Control Apparatus and Method."

SUMMARY OF THE INVENTION

The present invention is directed to an intrusion detection apparatus and method using a load balancer responsive to traffic conditions between a CPU and a GPU, which allocate packet character string check tasks for intrusion detection to a CPU or a GPU while taking into account processing performance and power consumption based on traffic conditions.

Furthermore, the present invention is directed to an intrusion detection apparatus and method using a load balancer responsive to traffic conditions between a CPU and a GPU, which allocate character string check tasks for packets to one of a CPU and a GPU based on the number of packets.

In accordance with an aspect of the present invention, there is provided an intrusion detection apparatus using a load balancer responsive to traffic conditions between a CPU and a GPU, including a packet acquisition unit configured to receive packets arriving from a plurality of reception queues, and to store packets belonging to the same flow in a single task queue; a character string check task allocation unit configured to determine the number of packets stored in the packet acquisition unit, and to allocate character string check tasks for the packets to the CPU or the GPU; a CPU character string check unit configured to compare the character strings of the packets with a character string defined in at least one detection rule inside the CPU; and a GPU character string check unit configured to compare the character strings of the packets with the character string defined in the detection rule inside the GPU.

The character string check task allocation unit may include a number-of-packets determination unit configured to determine the number of packets; and an allocation determination unit configured to determine whether to allocate the character string check tasks to the CPU character string check unit or the GPU character string check unit based on the number of packets, and to determine a number of packets to be allocated at one time to the CPU character string check unit or the GPU character string check unit.

The allocation determination unit may include a threshold value determination unit configured to determine whether to allocate the character string check tasks to the CPU character string check unit or the GPU character string check unit by determining one of a plurality of preset threshold value ranges within which the number of packets falls; and a number-of-allocation packets determination unit configured to determine the number of packets to be allocated to the CPU character string check unit or the GPU character string check unit at one time based on the determined threshold value range.

The threshold value determination unit may classify the number of packets based on low, middle and high threshold values; and the threshold value determination unit, when the packets are arriving, may determine the number of packets to fall within a first threshold value range if the number of packets is between a default value 0 and the middle threshold value, to fall within a second threshold value range if the number of packets is between the middle threshold value and the high threshold value, and to fall within a third threshold value range if the number of packets is above the high threshold value, and, when the packets are being allocated, determine the number of packets to fall within a fourth threshold value range if the number of packets is above the middle threshold value, to fall within a fifth threshold value range if the number of packets is between the middle threshold value and the low threshold value, and to fall within a sixth threshold value range if the number of packets is between the low threshold value and the default value.

The threshold value determination unit may determine the character string check tasks to be allocated to the CPU character string check unit in the first threshold value range, to the GPU character string check unit in the second threshold value range, the third threshold value range, the fourth threshold value range and the fifth threshold value range, and to the CPU character string check unit in the sixth threshold value range.

The number-of-allocation packets determination unit may classify the number of packets to be allocated at one time to one of the CPU character string check unit or the GPU character string check unit as one of minimum, intermediate and maximum values; and the number-of-allocation packets determination unit may determine the number of packets to be allocated at one time to be the minimum value in the first threshold value range, to be the intermediate value in the second threshold value range, to be the maximum value in the third threshold value range and the fourth threshold value range, to be the intermediate value in the fifth threshold value range, and to be the minimum value in the sixth threshold value range.

The detection rule may be at least one intrusion detection rule that defines check items for predetermined fields included in each packet and also defines a check sequence of the defined check items and check conditions of the defined check items.

The CPU character string check unit and the GPU character string check unit may perform pattern matching between a specific character string, predefined as corresponding to intrusion detection in the detection rule, and the character strings of the packets.

The intrusion detection apparatus may further include an additional rule check unit configured to make an additional rule check, which is present in the detection rule along with the character string check, on the packets on which the character string check has been made by the CPU character string check unit or the GPU character string check unit.

The intrusion detection apparatus may further include a CPU communication unit configured to perform communication with the GPU.

In accordance with an aspect of the present invention, there is provided an intrusion detection method using a load balancer responsive to traffic conditions between a CPU and a GPU, including receiving, by a packet acquisition unit, packets arriving from a plurality of reception queues, and storing, by the packet acquisition unit, packets belonging to an identical flow in a single task queue; determining, by a character string check task allocation unit, a number of packets stored in the packet acquisition unit, and allocating, by the character string check task allocation unit, character string check tasks for the packets to the CPU or the GPU; comparing, by a CPU character string check unit, character strings of the packets with a character string defined in at least one detection rule inside the CPU; and comparing, by a GPU character string, check unit, the character strings of the packets with the character string defined in the detection rule inside the GPU.

Allocating the character string check tasks for the packets to the CPU or the GPU may include determining the number of packets; and determining whether to allocate the character string check tasks to the CPU character string check unit or the GPU character string check unit based on the number of packets, and determining a number of packets to be allocated at one time to the CPU character string check unit or the GPU character string check unit.

Determining whether to allocate the character string check tasks to the CPU character string check unit or the GPU character string check unit and determining the number of packets to be allocated at one time to the CPU character string check unit or the GPU character string check unit may include determining whether to allocate the character string check tasks to the CPU character string check unit or the GPU character string check unit by determining one of a plurality of preset threshold value ranges within which the number of packets falls; and determining the number of packets to be allocated at one time to the CPU character string check unit or the GPU character string check unit based on the determined threshold value range.

Determining whether to allocate the character string check tasks to the CPU character string check unit or the GPU character string check unit by determining one of the plurality of preset threshold value ranges within which the number of packets falls may include classifying the number of packets based on low, middle and high threshold values; and, when the packets are arriving, determining the number of packets to fall within a first threshold value range if the number of packets is between a default value 0 and the middle threshold value, to fall within a second threshold value range if the number of packets is between the middle threshold value and the high threshold value, and to fall within a third threshold value range if the number of packets is above the high threshold value, and, when the packets are being allocated, determining the number of packets to fall within a fourth threshold value range if the number of packets is above the middle threshold value, to fall within a fifth threshold value range if the number of packets is between the middle threshold value and the low threshold value, and to fall within a sixth threshold value range if the number of packets is between the low threshold value and the default value.

Determining whether to allocate the character string check tasks to the CPU character string check unit or the GPU character string check unit by determining, one of the plurality of preset threshold value ranges within which the number of packets falls may include determining the character string check tasks to be allocated to the CPU character string check unit in the first threshold value range, to the GPU character string check unit in the second threshold value range, the third threshold value range, the fourth threshold value range and the fifth threshold value range, and to the CPU character string check unit in the sixth threshold value range.

Determining the number of packets to be allocated at one time to the CPU character string check unit or the GPU character string check unit based on the determined threshold value range may include classifying the number of packets to be allocated at one time to one of the CPU character string check unit or the GPU character string check unit as one of minimum, intermediate and maximum values; and determining the number of packets to be allocated at one time to be the minimum value in the first threshold value range, to be the intermediate value in the second threshold value range, to be the maximum value in the third threshold value range and the fourth threshold value range, to be the intermediate value in the fifth threshold value range, and to be the minimum value in the sixth threshold value range.

Comparing the character strings of the packets with the character string inside the CPU or the GPU may include performing pattern matching between a specific character string, predefined as corresponding to intrusion detection in the detection rule, and the character strings of the packets.

The intrusion detection method may further include, after comparing the character strings of the packets with the character string inside the CPU, making an additional rule check, which is present in the detection rule along with the character string check, on the packets.

The intrusion detection method may further include, after comparing the character strings of the packets with the character string inside the GPU, making an additional rule check, which is present in the detection rule along with the character string check, on the packets.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention will be described with reference to the accompanying drawings in order to describe the present invention in detail so that those having ordinary knowledge in the technical field to which the present pertains can easily practice the present invention. It should be noted that like reference numerals are used to designate like elements throughout the drawings as far as possible. In the following description of the present invention, detailed descriptions of known functions and constructions which are deemed to make the gist of the present invention obscure will be omitted.

An intrusion detection apparatus and method using a load balancer responsive to traffic conditions between a CPU and a GPU according to embodiments of the present invention will be described in detail below with reference to the accompanying drawings.

A CPU 100 according to the present invention includes a plurality of cores, and supports multithreading. That is, the CPU 100 uses one thread for each of the cores, and may perform storage, character string checks, and additional rule checks on incoming packets that arrive from reception queues 11 connected to network interfaces 10. Each of the network interfaces 10 of the CPU 100 is assigned to each port of a NIC, and is connected to a plurality of reception queues in order to receive high-speed packets. Accordingly, a thread assigned to each core can fetch a batch of packets in reception queues assigned to different NICs at the same time in order to receive a large number of packets, and thus all packets belonging to a single flow can be processed in the same core.

Meanwhile, a GPU 200 is used to prevent the concentration of load to the CPU 100. A high-performance GPU that has a large number of cores and high memory bandwidth may perform character string checks that require high computational load or frequent memory access. That is, according to the present invention, when high processing performance can be achieved by using only the CPU 100 because the lengths of packets are short or the number of packets included in each task queue is small, the GPU 200 may not be used.

Figure 1:
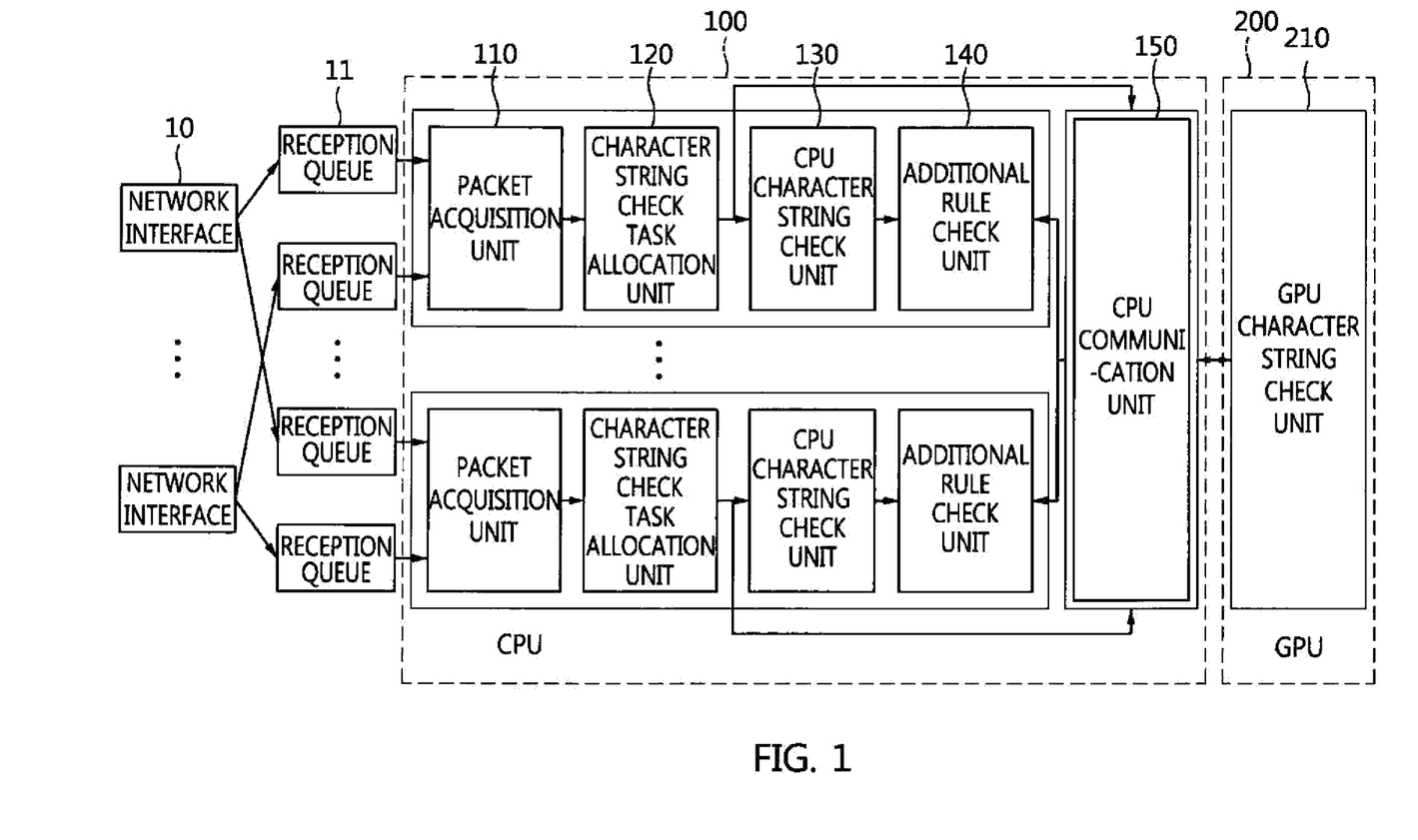
FIG. 1 is a diagram illustrating the configuration of an intrusion detection apparatus according to an embodiment of the present invention.

FIG. 1 is a diagram illustrating the configuration of an intrusion detection apparatus according to an embodiment of the present invention.

Referring to FIG. 1, an intrusion detection apparatus according to the present invention basically includes packet acquisition units 110, character string check task allocation units 120, CPU character string check units 130, additional rule check units 140, a CPU communication unit 150, and a GPU character string check unit 210. In this case, the packet acquisition units 110, the character string check task allocation units 120, the CPU character string check units 130, the additional rule check units 140, and the CPU communication unit 150 belong to the CPU 100, while the GPU character string check unit 210 belongs to the GPU 200.

Each of the packet acquisition units 110 stores packets that arrive from the plurality of reception queues. That is, the packet acquisition unit 110 functions to fetch packets from the network interface into the intrusion detection apparatus.

The packet acquisition unit 110 stores the packets of the plurality of reception queues 11 in a task queue allocated to each thread so that it can process a large number of packets at the same time. That is, the packet acquisition unit 110 allows packets belonging to a single flow to be processed in the same task queue.

Each of the character string check task allocation units 120 determines the number of packets stored in the packet acquisition unit 110, and allocates character string check tasks for the packets to the CPU character string check unit 130 of the CPU 100 or the GPU character string check unit 210 of the GPU 200. The character string check task allocation unit 120 functions to allocate character string check tasks for packets to the CPU character string check unit 130 or the GPU character string check unit 210 while taking into consideration load and power consumption, which will be described in detail later with reference to FIGS. 2 to 4.

Each of the CPU character string check units 130 compares the character strings of the packets with a character string defined in a detection rule inside the CPU 100. The CPU character string check unit 130 performs pattern matching between a specific character string, predefined as corresponding to intrusion detection in the detection rule, and the character strings of the packets. In this case, the detection rule refers to at least one intrusion detection rule that defines check items for predetermined fields included in each packet and also defines the check sequence and check conditions of the defined check items.

The fields of a packet for intrusion detection are divided into a header part in which an address and other control information are contained and a payload part in which actual user data is contained. The intrusion detection apparatus according to the present invention checks whether a specific character string that is determined to be intrusion detection is contained in the payload of a packet using a pattern matching method using one or more simple character strings or regular expressions.

Each of the additional rule check units 140 makes an, additional rule check on the packets on which the character string, check has been made. The additional rule check unit 140 makes a check related to a check item, that is, an additional rule check task, which is present in the detection rule along with the character string check task, on the packets on which the character string check has been made by the CPU character string check unit 130. Furthermore, the additional rule check unit 140 receives the packets on which the character string check has been made from the GPU character string check unit 210 through the CPU communication unit 150, and then makes an additional rule check thereon.

The CPU communication unit 150 deals with communication between the CPU 100 and the GPU 200. The CPU communication unit 150 transfers packets to the GPU 200 to which one or more character string check tasks are allocated by the character string check task allocation unit 120, and receives the check results of the GPU character string check unit 210 and transfers the check results to the additional rule check unit 140, thereby allowing an additional rule check to be performed.

The GPU character string check unit 210 compares the character strings of packets with the character string defined in the detection rule inside the GPU 200. The GPU character string check unit 210 performs pattern matching between the specific character string, predefined as corresponding to intrusion detection in the detection rule, and the character strings of the packets in the same manner as the CPU character string check unit 130.

Figure 2:
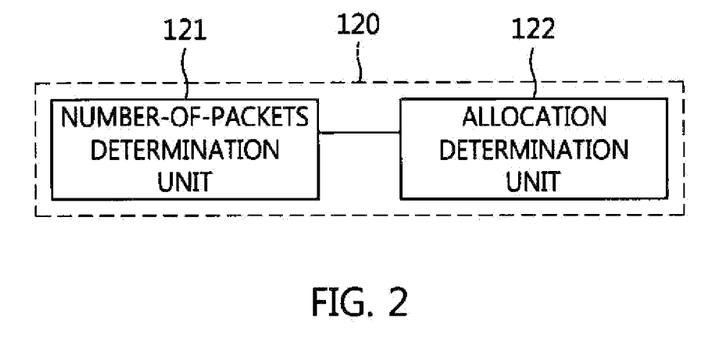
FIG. 2 is a diagram illustrating the detailed configuration of a character string check task allocation unit according to an embodiment of the present invention.

FIG. 2 is a diagram illustrating the detailed configuration of a character string check task allocation unit according to an embodiment of the present invention.

Referring to FIG. 2, the character string check task allocation unit 120 according to this embodiment of the present invention determines the number of packets stored in the packet acquisition unit 110, and allocates character string check tasks for the packets to the CPU character string check unit 130 or the GPU character string check unit 210.

For this purpose, the character string check task allocation unit 120 includes a number-of-packets determination unit 121 and an allocation determination unit 122.

The number-of-packets determination unit 121 determines the number of packets stored in the packet acquisition unit 110.

Based on the determined number of packets, the allocation determination unit 122 allocates character string check tasks to the CPU character string check unit 130 if the number of packets is small or to the GPU character string check unit 210 if the number of packets is large, and determines the number of packets that are allocated at one time to the CPU character string check unit 130 or the GPU character string check unit 210.

That is, the allocation determination unit 122 selects the CPU 100 if processing can be performed without loss of packets because the number of packets is small, or selects the GPU 200 if a task requiring computational capability or frequent memory access is performed or if the number of packets to be processed is large in the packet acquisition unit 110. This will be described in detail below with reference to FIGS. 3 and 4.

Figure 3:
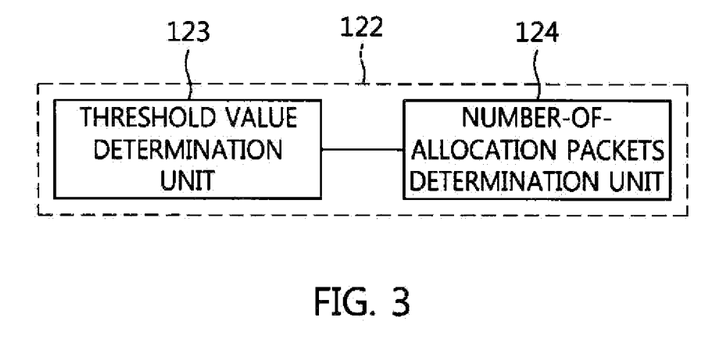
FIGS. 3 and 4 are diagrams illustrating the detailed configuration of an allocation determination unit according to an embodiment of the present invention.
Figure 4:
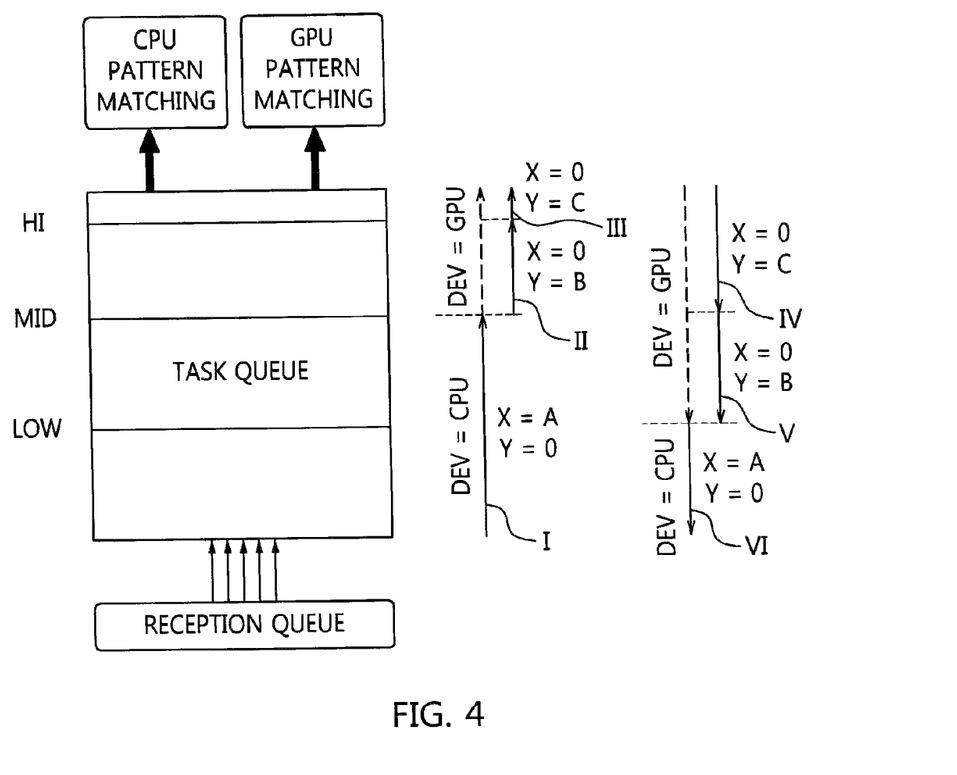

FIGS. 3 and 4 are diagrams illustrating the detailed configuration of an allocation determination unit according to an embodiment of the present invention.

Referring to FIG. 3, the allocation determination unit 122 according to this embodiment of the present invention allocates character string check tasks to the CPU character string check unit 130 if the number of packets is small or to the GPU character string check unit 210 if the number of packets is large, and determines the number of packets that are allocated at one time to the CPU character string check unit 130 or the GPU character string check unit 210.

For this purpose, the allocation determination unit 122 includes a threshold value determination unit 123 and a number-of-allocation packets determination unit 124.

The threshold value determination unit 123 determines one of a plurality of preset threshold value ranges within which the number of packets falls, and determines whether character string check tasks will be allocated to the CPU character string check unit 130 or the GPU character string check unit 210.

The threshold value determination unit 123 classifies the number of packets based on low, middle and high threshold values LOW, MID and HI. In this case, over an actual network, the number of arriving packets is not uniform, and there are many cases where a number of packets smaller than the number of packets that can be received at one time. Accordingly, low, middle and high threshold values LOW, MID or HI may vary depending on system performance. For example, if the maximum number of packets that can be received by the packet acquisition unit 110 is Max, the low, middle and high threshold values may be set to Max*0.1, Max*0.75, and Max*0.9, respectively.

Furthermore, the threshold value determination unit 123 determines one of six threshold value ranges, previously set based on the threshold values, within which the number of packets falls.

That is, as illustrated in FIG. 4, when the number of arriving packets increases, the threshold value determination unit 123 determines the number of packets to fall within first threshold value range I if the number of packets is between default value 0 and the middle threshold value, to fall within second threshold value range II if the number of packets is between the middle threshold value and the high threshold value, and to fall within third threshold value range III if the number of packets is above the high threshold value. Furthermore, when the number of packets to be processed decreases, the threshold value determination unit 123 determines the number of packets to fall within fourth threshold value range IV if the number of packets is above the middle threshold value, to fall within fifth threshold value range V if the number of packets is between the middle threshold value and the low threshold value, and to fall within sixth threshold value range VI if the number of packets is between the low threshold value and the default value. The reason why the threshold value range does not vary at the high threshold value HI but at the middle threshold value MID when the number of packets to be processed decreases is to prevent a pattern matching agent, that is, the CPU or the GPU, from frequently changing.

Furthermore, the threshold value determination unit 123 determines character string check tasks to be allocated to the CPU character string check unit 130 in the first threshold value range I, to the GPU character string check unit 210 in the second threshold value range II, the third threshold value range III, the fourth threshold value range IV and the fifth threshold value range V, and to the CPU character string check unit 130 in the sixth threshold value range VI.

The number-of-allocation packets determination unit 124 determines the number of packets to be allocated at one time to the CPU character string check unit 130 or GPU character string check unit 210 based on the determined threshold value range.

As illustrated in FIG. 4, the number-of-allocation packets determination unit 124 determines the number of packets (X) allocated to the CPU character string check unit 130 of the CPU 100, and the number of packets (Y) allocated to the GPU character string check unit 210 of the GPU 200 based on the device DEV determined by the threshold value determination unit, that is, the CPU character string check unit 130 of the CPU 100 or the GPU character string check unit 210 of the GPU 200. In this case, the initial value of X is A, and the initial value of Y is 0. The present invention basically uses the CPU 100.

The number-of-allocation packets determination unit 124 classifies the number of packets to be allocated at one time to the CPU character string check unit 130 or the GPU character string check unit 210 as minimum value A, intermediate value B or maximum value C. In this case, the maximum value C is set to a maximum value at which overflow does not occur in the memory of the CPU 100, the intermediate value B is set to a value smaller than the maximum value C in order to increase packet processing performance, and the minimum value A is set to a value smaller than the intermediate value B. Accordingly, the maximum value C may be set to a value that enables maximum fetching while minimizing the occurrence of overflow in the cache of the CPU 100, the intermediate value B may be set to a value that is determined based on the number of cores of a processing device, for example, about ½*C, and the intermediate value B may be set to a value that is slightly smaller than the maximum value C. The values A, B and C may vary depending on system performance.

Based on the above settings, the number-of-allocation packets determination unit 124 determines the number of packets to be allocated at one time to be the minimum value A in the first threshold value range I, to be the intermediate value B in the second threshold value range II, to be the maximum value C in the third threshold value range III and the fourth threshold value range IV, to be the intermediate value B in the fifth threshold value range V, and to be the minimum value A in the sixth threshold value range VI. That is, the number-of-allocation packets determination unit 124 determines X and Y to be A and 0, respectively, in the first threshold value range I, to be 0 and B, respectively, in the second threshold value range II, to be 0 and C, respectively, in the third threshold value range III and the fourth threshold value range IV, to be 0 and B, respectively, in the fifth threshold value range V, and to be A and 0, respectively, in the sixth threshold value range VI.

Figure 5:
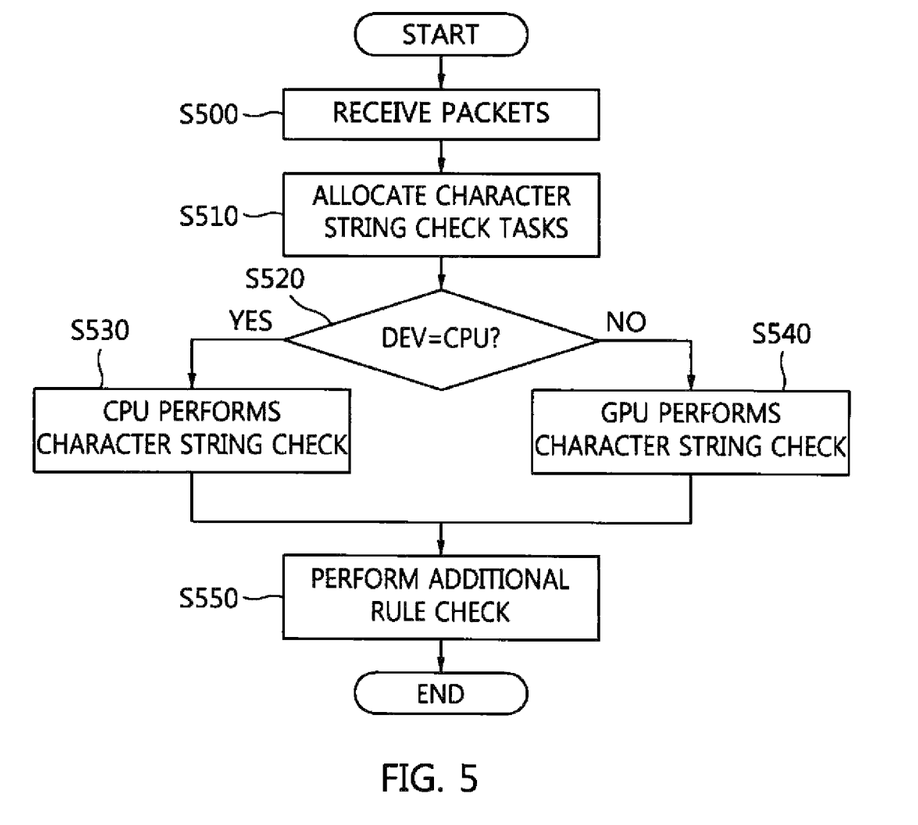
FIG. 5 is a flowchart illustrating the sequence of an intrusion detection method according to an embodiment of the present invention.

FIG. 5 is a flowchart illustrating the sequence of an intrusion detection method according to an embodiment of the present invention.

Referring to FIG. 5, the intrusion detection method according to this embodiment of the present invention is a method using the above-described intrusion detection apparatus. In the following description, redundant descriptions will be omitted.

First, the packet acquisition unit 110 receives packets arriving from a plurality of reception queues and then stores packets belonging to the same flow in a single task queue at step S500.

Thereafter, the character string check task allocation unit 120 determines the number of packets stored in the packet acquisition unit 110 and then, allocates character string check tasks for the packets to the CPU character string check unit 130 of the CPU 100 or the GPU character string check unit 210 of the GPU 200 at step S510. Step S510 is the step of allocating the character string check tasks for the packets to the CPU character string check unit 130 or the GPU character string check unit 210 while taking into account load and power consumption, which will be described in detail below with reference to FIGS. 6 to 8.

Thereafter, the CPU character string check unit 130 compares the character strings of the packets with at least one character string defined in at least one detection rule at step S520. At step S520, pattern matching is performed between the specific character string, predefined as corresponding to intrusion detection in the detection rule, and the character strings of the packets.

After step S520, an additional rule check, which is present in the detection rule along with the character string check, is, made on the packets at step S530.

Thereafter, the GPU character string check unit 210 compares the character strings of the packets with the character string defined in the detection rule at step S540. At step S540, pattern matching is performed between the specific character string, predefined as corresponding to intrusion detection in the detection rule, and the character strings of the packets.

After step S540, an additional rule check, which is present in the detection rule along with the character string check, is made on the packets at step S550.

Figure 6:
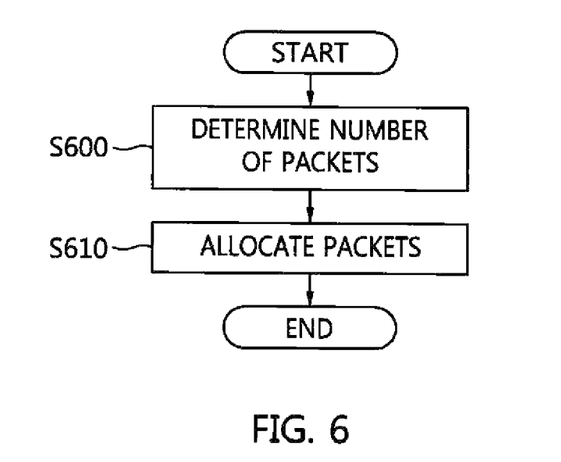
FIG. 6 is a flowchart illustrating a method of allocating character string check tasks according to an embodiment of the present invention.

FIG. 6 is a flowchart illustrating a method of allocating character string check tasks according to an embodiment of the present invention.

Referring to FIG. 6, first, the number of packets is determined at step S600.

Thereafter, based on the number of packets, it is determined whether to allocate the character string check tasks to the CPU character string check unit 130 because the number of packets is small or to the GPU character string check unit 210 because the number of packets is large and also the number of packets that are allocated at one time to the CPU character string check unit 130 or the GPU character string check unit 210 is determined at step S610. That is, at step S610, the CPU 100 is selected in the case where processing can be performed without loss of packets because the number of packets is small, and the GPU 200 is selected in the case where computational capability is required, a task requiring frequent memory access is performed, or the number of packets to be processed is large in the packet acquisition unit 110. This will be described in detail below with reference to FIG. 7.

Figure 7:
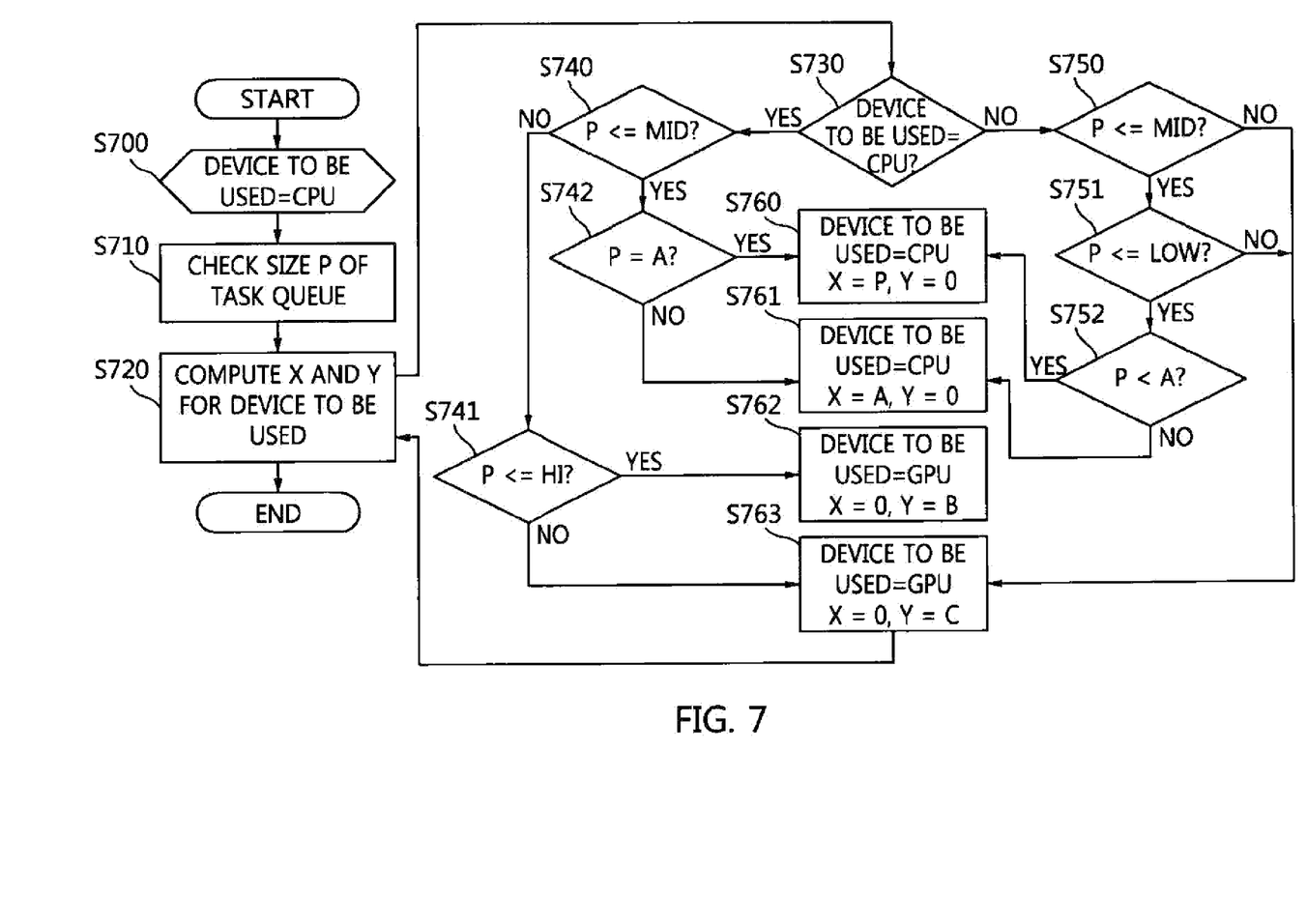
FIG. 7 is a flowchart illustrating a method of determining whether to allocate character string check tasks and determining the number of packets to be allocated at one time in the method of allocating character string check tasks, according to an embodiment of the present invention.

FIG. 7 is a flowchart illustrating a method of determining whether to allocate character string check tasks and determining the number of packets to be allocated at one time in the method of allocating character string check tasks, according to an embodiment of the present invention.

Referring to FIG. 7, assuming that packets are allocated to the CPU of the character string check unit 130, the initial value of the number of packets (X) to be allocated to the CPU character string check unit 130 and the initial value of the number of packets (Y) to be allocated to the GPU character string check unit 210 of the GPU 200 are set. In this case, the initial value of X is set to A and the initial value of Y is set to 0 at step S700.

Thereafter, one ("P" in the drawing) of a plurality of preset threshold value ranges to which the number of packets corresponds is determined at step S710.

Thereafter, whether to allocate the character string check tasks to the CPU character string, check unit 130 or to the GPU character string check unit 210 is determined. That is, it is determined whether a task queue that is determined based on the number of packets is the CPU character string check unit 130 of the CPU 100 or the GPU character string check unit 210 of the GPU 200. Furthermore, once a device to be used has been determined, the number of packets X to be allocated to the CPU character string check unit 130 of the CPU 100 and the number of packets Y to be allocated to the GPU character string check unit 210 of the GPU 200 are calculated and determined at step S720.

Thereafter, it is determined whether the device to be used is the CPU character string check unit 130 of the CPU 100 at step S730.

Thereafter, whether to allocate the character string check tasks to the CPU character string check unit 130 or to the GPU character string check unit 210 is determined by determining one of a plurality of preset threshold value ranges to which the number of packets corresponds at steps S740 and S750. In this case, when the number of arriving packets increases, the number of packets is determined to fall within first threshold value range I if the number of packets is between default value 0 and the middle threshold value, to fall within second threshold value range II if the number of packets is between the middle threshold value and the high threshold value, and to fall within third threshold value range III if the number of packets is above the high threshold value, and, when the number of packets to be processed decreases, the number of packets is determined to fall within fourth threshold value range IV if the number of packets is above the middle threshold value, to fall within fifth threshold value range V if the number of packets is between the middle threshold value and the low threshold value, and to fall within sixth threshold value range VI if the number of packets is between the low threshold value and the default value, at step S741, S742, S751 and S752.

Thereafter, based on the determined threshold value range, the number of packets to be allocated at one time to the CPU character string check unit 130 or the GPU character string check unit 210 is determined at steps S760, S761, S762 and S763.

In this case, the number of packets to be allocated at one time to the CPU character string check unit 130 or the GPU character string check unit 210 is classified as minimum value A, intermediate value B or maximum value C. In this case, the maximum value C is set to a maximum value at which overflow does not occur in the memory of the CPU 100, the intermediate value B is set to a value smaller than the maximum value C in order to increase packet processing performance, and the minimum value A is set to a value smaller than the intermediate value B. In greater detail, the number of packets to be allocated at one time is determined to be the minimum value A in the first threshold value range I, to be the intermediate value B in the second threshold value range II, to be the maximum value C in the third threshold value range III and the fourth threshold value range IV, to be the intermediate value B in the fifth threshold value range V, and to be the minimum value A in the sixth threshold value range VI. That is, the number-of-allocation packets determination unit 124 determines X and Y to be A and 0, respectively, in the first threshold value range I, to be 0 and B, respectively, in the second threshold value range II, to be 0 and C, respectively, in the third threshold value range III and the fourth threshold value range IV, to be 0 and B, respectively, in the fifth threshold value range V, and to be A and 0, respectively, in the sixth threshold value range VI.

As described above, according to the present invention, the thread of each core of the CPU is configured to fetch packets stored in the reception queues of a plurality of NIC cards to the task queue at the same time in order to transfer packets arriving at the high-speed NIC cards to the CPU.

Furthermore, according to the present invention, the excessive use of unnecessary memory is reduced by sharing information required for detection using a method, such as multi-threading or global variables, and the number of function calls and the number of memory accesses are reduced by processing a plurality of packets in the task queue at one time.

Furthermore, according to the present invention, the use of a per-process memory assignment scheme, such as Non-Uniform Memory Access (NUMA), is determined, and then received packets are stored in memory of an area assigned to the corresponding core. Accordingly, each core of the CPU is prevented from accessing memory of another area, thereby increasing memory access speed.

Furthermore, according to the present invention, the GPU is appropriate for tasks requiring memory access and a large quantity of comparison operations, and character string check tasks corresponding to the above tasks are allocated to the GPU. Character string check tasks are internally processed by multi-character string matching and regular expression matching, which correspond to content matching and PCRE matching in Snort, that is, a representative signature-based open intrusion detection system.

Accordingly, when the number of packets is small or the lengths of packets are short, only the CPU is used, and thus the load and power consumption required to transmit necessary data to the GPU is reduced.

Furthermore, in order to ensure sufficient performance, the allocation of tasks to the CPU or the GPU and the number of packets to be processed are dynamically determined depending on the condition of the task queue.

The intrusion detection apparatus and method using a load balancer responsive to traffic conditions between a CPU and a GPU according to the present invention have the advantage of allocating intrusion detection tasks to a CPU or a GPU while taking into account load and power consumption based on traffic conditions, thereby preventing the concentration of load to the CPU.

Furthermore, the intrusion detection apparatus and method using a load balancer responsive to traffic conditions between a CPU and a GPU according to the present invention have the advantage of dynamically determining whether to allocate character string check tasks for packets and the number of packets to be allocated, thereby rapidly and efficiently performing intrusion detection without loss of packets.

Furthermore, the intrusion detection apparatus and method using a load balancer responsive to traffic conditions between a CPU and a GPU according to the present invention have the advantage of processing high-speed packets in a network environment, such as a backbone network, while increasing the efficiency of use of memory and also eliminating a system stability destruction factor attributable to thermal radiation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An intrusion detection method using a load balancer responsive to traffic conditions between a first processing unit and a second processing unit, the method comprising:
   receiving, by a packet acquisition unit, packets arriving from a plurality of reception queues, and storing packets belonging to an identical flow in a single task queue;
   determining at least one of a number of packets, account load, and power consumption, and determining whether the string check tasks being performed by the first processing unit alone or allocation of the character string check task to the second processing unit;
   in response to determination of the character string check tasks being allocated to the second processing unit,
   comparing character strings of the packets with a character string defined in a first detection rule of the first processing unit; and
   comparing the character strings of the packets with the character string defined in a second detection rule of the second processing unit,
   wherein the first processing unit comprises a central processing unit (CPU), the second processing unit comprises a graphic processing unit (GPU), the first character string check unit comprises a CPU character string unit, and the second character string unit comprises a GPU character string unit, and wherein
   allocating the character string check tasks for the packets to the CPU or the GPU comprises:
   determining the number of packets; and determining whether to allocate the character string check tasks to the CPU character string check unit or the GPU character string check unit based on the number of packets, and determining a number of packets to be allocated at one time to the CPU character string check unit or the GPU character string check unit, wherein determining whether to allocate the character string check tasks to the CPU character string check unit or the GPU character string check unit and determining the number of packets to be allocated at one time to the CPU character string check unit or the GPU character string check unit comprises:

determining whether to allocate the character string check tasks to the CPU character string check unit or the GPU character string check unit by determining one of a plurality of preset threshold value ranges within which the number of packets falls; and determining the number of packets to be allocated at one time to the CPU character string check unit or the GPU character string check unit based on the determined threshold value range, wherein determining the number of packets to be allocated at one time to the CPU character string check unit or the GPU character string check unit based on the determined threshold, value range comprises classifying the number of packets to be allocated at one time to one of the CPU character string check unit or the GPU character string check unit as one of minimum, intermediate and maximum values.

2. The intrusion detection method of claim 1, wherein determining whether to allocate the character string check tasks to the CPU character string check unit or the GPU character string check unit by determining one of the plurality of preset threshold value ranges within which the number of packets falls comprises:

classifying the number of packets based on low, middle and high threshold values, the classification being performed according to the first detection rule corresponding to the first processing unit and the second detection rule corresponding to the second processing unit; and when the packets are arriving, determining the number of packets to fall within a first threshold value range if the number of packets is between a default value 0 and the middle threshold value, to fall within a second threshold value range if the number of packets is between the middle threshold value and the high threshold value, and to fall within a third threshold value range if the number of packets is above the high threshold value, and, when the packets are being allocated, determining the number of packets to fall within a fourth threshold value range if the number of packets is above the middle threshold value, to fall within a fifth threshold value range if the number of packets is between the middle threshold value and the low threshold value, and to fall within a sixth threshold value range if the number of packets is between the low threshold value and the default value.

3. The intrusion detection method of claim 2, further comprising:

allocating the character string check tasks to the CPU character string check unit or the GPU character string check unit according to the first detection rule corresponding to the first processing unit and the second detection rule corresponding to the second processing unit, allocating the character string check tasks to the CPU character string check unit in response to detection the packets be the first threshold value range, allocating the character string check tasks to the GPU character string check unit in response to detection the packets be the second threshold value range, the third threshold value range, the fourth threshold value range and the fifth threshold value range, and allocating the character string check tasks to the CPU character string check unit in the response to detection the packets be sixth threshold value range.

4. The intrusion detection method of claim 3, wherein determining the number of packets to be allocated at one time to the CPU character string check unit or the GPU character string check unit based on the determined threshold value range comprises:

determining the number of packets to be allocated at one time to be the minimum value in the first threshold value range, to be the intermediate value in the second threshold value range, to be the maximum value in the third threshold value range and the fourth threshold value range, to be the intermediate value in the fifth threshold value range, and to be the minimum value in the sixth threshold value range.

5. The intrusion detection method of claim 1, wherein comparing the character strings of the packets with the character string of the first processing unit or the second processing unit comprises performing pattern matching between a specific character string, predefined as corresponding to intrusion detection in the detection rule, and the character strings of the packets.

6. The intrusion detection method of claim 1, further comprising, subsequent to comparing the character strings of the packets with the character string of the first processing unit, performing an additional rule check, which is present in the detection rule along with the character string check, on the packets.

7. The intrusion detection method of claim 1, further comprising, subsequent to comparing the character strings of the packets with the character string inside the second processing unit, performing an additional rule check, which is present in the detection rule along with the character string check, on the packets.

8. An intrusion detection apparatus using a load balancer responsive to traffic conditions between a first processing unit and a second processing unit, comprising:

a packet acquisition unit configured to receive packets arriving from a plurality of reception queues, and to store packets belonging to an identical flow in a single task queue;

a character string check task allocation unit configured to determine a number of packets stored in the packet acquisition unit, and in response to detection of an account load and power consumption thereof, to determine allocation of character string check tasks for the packets, the string check tasks being performed by the first processing unit alone or allocation to the second processing unit based on at least one of the account load, power consumption, and the number of packets, wherein if the character string check tasks are determined to allocate to the second processing unit, a first character string check unit configured to compare character strings of the packets with a character string defined in a first detection rule of the first processing unit; and a second character string check unit configured to compare the character strings of the packets with the character string defined in a second detection rule of the second processing unit, wherein the first processing unit comprises a central processing unit (CPU), the second processing unit comprises a graphic processing unit (GPU), the first character string check unit comprises a CPU character string unit, and the second character string unit comprises a GPU character string unit, and wherein the character string check task allocation unit comprises:

a number-of-packets determination unit configured to determine the number of packets; and an allocation determination unit configured to determine whether to allocate the character string check tasks to the CPU character string check unit, or the GPU character string check unit based on the number of packets, and to determine a number of packets to be allocated at one time to the CPU character string check unit or the GPU character string check unit, wherein the allocation determination unit comprises:

a threshold value determination, unit configured to determine whether to allocate the character string check tasks to the CPU character string check unit or the GPU character string check unit by determining one of a plurality of preset threshold value ranges within which the number of packets falls; and a number-of-allocation packets determination unit configured to determine the number of packets to be allocated to the CPU character string check unit or the GPU character string check unit at one time based on the determined threshold value range, wherein the number-of-allocation packets determination unit is configured to classify the number of packets to be allocated at one time to one of the CPU character string check unit or the GPU character string check unit as one of minimum, intermediate and maximum values.

9. The intrusion detection apparatus of claim 8, wherein:

the threshold value determination unit is configured to classify the number of packets based on low, middle and high threshold values the classification being performed according to the first detection rule corresponding to the first processing unit and the second detection rule corresponding to the second processing unit; and the threshold value determination unit, when the packets are arriving, configured to determine the number of packets to fall within a first threshold value range if the number of packets is between a default value 0 and the middle threshold value, to fall within a second threshold value range if the number of packets is between the middle threshold value and the high threshold value, and to fall within a third threshold value range if the number of packets is above the high threshold value, and, when the packets are being allocated, to determine the number of packets to fall within a fourth threshold value range if the number of packets is above the middle threshold value, to fall within a fifth threshold value range if the number of packets is between the middle threshold value and the low threshold value, and to fall within a sixth threshold value range if the number of packets is between the low threshold value and the default value.

10. The intrusion detection apparatus of claim 9, wherein the threshold value determination unit is configured to allocate the character string check tasks to the CPU character string check unit in response to detection the packets be the first threshold value range, to allocate the character string check tasks to the GPU character string check unit in response to detection the packets be the second threshold value range, the third threshold value range, the fourth threshold value range and the fifth threshold value range, and to allocate the character string check tasks to the CPU character string check unit in response to detection the packets be the sixth threshold value range.

11. The intrusion detection apparatus of claim 10, wherein the number-of-allocation packets determination unit is configured to determine the number of packets to be allocated at one time to be the minimum value in the first threshold value range, to be the intermediate value in the second threshold value range, to be the maximum value in the third threshold value range and the fourth threshold value range, to be the intermediate value in the fifth threshold value range, and to be the minimum value in the sixth threshold value range.

12. The intrusion detection apparatus of claim 8, wherein the detection rule is at least one intrusion detection rule that defines check items for predetermined fields included in each packet and also defines a check sequence of the defined check items and check conditions of the defined check items.

13. The intrusion detection apparatus of claim 8, wherein the first character string check unit and the second character string check unit perform pattern matching between a specific character string, predefined as corresponding to intrusion detection in the detection rule, and the character strings of the packets.

14. The intrusion detection apparatus of claim 8, further comprising:

an additional rule check unit configured to make an additional rule check, which is present in the detection rule along with the character string check, on the packets the subsequent to character string check having been made by the first character string check unit or the second character string check unit.

15. The intrusion detection apparatus of claim 8, further comprising:

a first communication unit configured to perform communication with the second processing unit.

* * * * *